US009420759B2

(12) United States Patent
Aton

(10) Patent No.: US 9,420,759 B2
(45) Date of Patent: Aug. 23, 2016

(54) VEHICLE MOUNTED FEED HOPPER DEVICE

(71) Applicant: Rusty D. Aton, Springfield, MO (US)

(72) Inventor: Rusty D. Aton, Springfield, MO (US)

( * ) Notice: Subject to any disclaimer, the term of this patent is extended or adjusted under 35 U.S.C. 154(b) by 336 days.

(21) Appl. No.: 13/910,871

(22) Filed: Jun. 5, 2013

(65) Prior Publication Data

US 2013/0327277 A1 Dec. 12, 2013

Related U.S. Application Data

(60) Provisional application No. 61/689,460, filed on Jun. 6, 2012.

(51) Int. Cl.
*A01K 1/00* (2006.01)
*A01K 5/00* (2006.01)
*A01K 39/00* (2006.01)
*A01K 5/02* (2006.01)

(52) U.S. Cl.
CPC ............... *A01K 5/0258* (2013.01); *A01K 5/002* (2013.01)

(58) Field of Classification Search
USPC ......... 119/51.01, 57.5, 57.7, 57.92, 901, 900, 119/52.1, 56.1, 53, 56.2, 57.2, 57.6, 902; 366/603
See application file for complete search history.

(56) References Cited

U.S. PATENT DOCUMENTS 1,035,288 A * 8/1912 Williams ...................... 366/291
3,265,227 A * 8/1966 Vratil et al. ................... 414/526
3,706,442 A * 12/1972 Peat .............................. 366/186
3,790,138 A * 2/1974 Neier ............................ 366/186
4,330,091 A * 5/1982 Rozeboom et al. ............. 241/73
4,369,927 A * 1/1983 Rozeboom ....................... 241/73
4,462,693 A * 7/1984 Buschbom et al. ........... 366/189
4,480,927 A * 11/1984 Peat et al. ..................... 366/299
4,597,672 A * 7/1986 Neier et al. ................... 366/186
4,672,917 A * 6/1987 Fox .............................. 119/57.1
4,707,140 A 11/1987 Mohrlang
4,799,800 A 1/1989 Schuler
4,896,970 A 1/1990 Schuler
4,987,850 A * 1/1991 McCracken .................. 118/303
5,516,009 A * 5/1996 Kautz ........................... 222/238
5,653,567 A 8/1997 Taylor
5,740,950 A * 4/1998 Kanzler et al. ................ 222/238
5,829,649 A * 11/1998 Horton .......................... 222/636
6,263,833 B1 7/2001 Runyan
6,923,393 B1 * 8/2005 Neier et al. ..................... 241/30
6,945,485 B1 9/2005 Douglas
7,028,932 B2 * 4/2006 Lucas et al. ................ 241/101.8
7,507,016 B2 3/2009 Huberdeau
8,573,829 B2 * 11/2013 Gordon ...................... 366/155.1
2007/0297284 A1 * 12/2007 Neier et al. ................... 366/299
2009/0238031 A1 * 9/2009 Conard et al. ............. 366/162.2

* cited by examiner

*Primary Examiner* — Andrea Valenti
(74) *Attorney, Agent, or Firm* — Charles McCloskey

(57) ABSTRACT

A vehicle mounted feed hopper device has an enclosure upon a base, the enclosure having a V shape, at least one paddle mixer within the enclosure, a conveyor beneath the paddle mixer, an outlet proximate one end of the conveyor, a chain drive connected to the paddle mixer and the conveyor, and a hydraulic motor driving the chain drive through gearing. The device operates like a horizontal screw total mixed ration, but at a smaller scale. The invention accepts multiple grain products through its top and mixes them to blends suitable for livestock, except for roughage products which exceed the capacity of this device. The device dispenses its mixed feed through the outlet as it meters feed into feed bunks for the livestock.

5 Claims, 6 Drawing Sheets

1 12 5 4 7 8 8 9 10 10 13 14 15 3a 6 2 2a 3 2b 11

VEHICLE MOUNTED FEED HOPPER DEVICE

CROSS-REFERENCE TO RELATED APPLICATION

This non-provisional application claims priority to the provisional application 61/689,460 filed on Jun. 6, 2012 which is owned by the same inventor.

BACKGROUND OF THE INVENTION

The vehicle mounted feed hopper device generally relates to agricultural implements and more specifically to portable livestock feed delivery devices. More particularly, the invention mixes feed as its paddle mixers and dispensing screw turn oppositely.

For millennia, people have raised livestock. People herded the livestock on range, often open, and the livestock ate what they could find. Though this description mentions livestock and cattle, livestock includes other animals reared for human consumption. People gathered livestock into herds of a size that fit the capacity of the owner. In some countries, large herds equated to immense wealth. Here, large herds spawned the cowboys of the Old West. The cowboys would gather the herds from Texas to Montana and move the herds towards the interior of the Great Plains, such as Kansas railheads for live transport to the East Coast or for packing activity elsewhere in the country. The cattle drives of the Old West became legend for their size and the consumption of forage by the cattle on the move. Large numbers of cattle in a herd often called for a large ranch. Select ranches, as in Texas, consisted of many square miles. Over time, disputes arose between settlers on the Great Plains and the cattlemen moving their herds across the ranges of the Great Plains. In time, governmental action settled the dispute and allowed settlers to remain, dooming free range of cattle. Cattle returned to ranches. With the onset of two World Wars, demand for beef continued its increases.

Though no longer able to range freely, cattle proliferated on ranches. Once big in the days of cattle drives, ranches remain big and hold large herds of cattle on their many hundreds of acres or square miles. Ranching and cattle remain big business in the country. Though livestock have been with people for millennia, a key problem remains: livestock must eat and grow. Early on, cowboys moved cattle for foraging off the land. Keeping of cattle on ranches though limited foraging to defined land parcels. Weather and crop pests may further curtail foraging. However, cattlemen and ranchers supplement forage for livestock with feeds of all description.

One feed includes blending grains with silage such as hay, that has a long stem, and delivering the blended feed to the livestock at feeding stations upon a ranch. The feeding stations include various bunkers or troughs that hold the feed at a height and position suitable for the animals to consume. The cattleman then restocks the bunkers or troughs as needed by the livestock or as desired by the cattleman for weight gain of the cattle. When a cattleman buys grain products directly from the suppliers instead of from the feed mill, the cattleman saves a significant amount of cost. Feed mills have a customary markup on their grains, as most distributors do for their costs, but they also charge a fee to mix grain products together before delivering them to your ranch or farm. Large cattle operations use Total Mixed Ration machines, or TMR, to cut out the middleman from their grain products. A ranching operation large enough to afford a TMR then purchases its commodities, i.e. corn, soy beans, and distillers grain, directly from the producers. A ranching operation then saves money in two respects: lower cost of mixing the commodities into a feed ration and the markup on the commodity from the feed mill.

DESCRIPTION OF THE PRIOR ART

Over the years, ranchers and implement makers have built and used various harvesting and feed processing machinery. The machinery accepts the agricultural product, typically plant based, mixes it, and then delivers it to the location desired by the rancher. The prior art includes two classes of feed handling machinery. The first class includes small, vehicle mounted, mobile animal feeding hopper, such as that shown by U.S. Pat. No. 5,653,567 to Taylor and U.S. Pat. No. 6,263,833 to Runyan. The second class has a larger mobile feed mixing machine called a Total Mixed Ration, or "TMR" machine such as that shown by U.S. Pat. No. 6,945,485 to Douglas, U.S. Pat. No. 4,896,970 and U.S. Pat. No. 4,799,800 to Schuler, U.S. Pat. No. 4,707,140 to Mohrlang, and U.S. Pat. No. 7,507,016 to Huberdeau.

The small feed hoppers have a typical mount upon a flat bed ¾ or 1 ton pickup truck. They have open tops for addition of animal feed from a silo, a larger truck, or an implement. Normally, this feed has a pre-mixed set of grains, but can be an individual ingredient. The feeder then goes to the field or location via the pickup truck and at the field, where an electrically driven motor meters out the feed into feed bunks, or troughs, for the livestock. These feed hoppers also have counters that allow the operator to know how much feed remains in a hopper or has left the hopper into the feed bunk. The counters differ slightly from manufacturer to manufacturer. The prior art patents above describe the counting devises for each unit. The main two manufacturers of these types of units specialize and only build agricultural hoppers.

The larger TMRs have two configurations: vertical screw and horizontal screw. Each of these configurations has multiple subtypes, but in each, the mixer takes in multiple different products and combines them into a homogenous mixture. TMRs have their name because of their ability to mix grains as well as roughage. Roughage, the main ingredient in most grazing animal's diets, generally comes in the form of hay and silage, that have long stems from their parent plants. TMRs have their typical mount upon large or medium duty, straight trucks or on trailers connected to large agricultural tractors. All TMRs receive product through an open top. The product is mixed and then metered through a gate in the side of the TMR for dispensing. Like the smaller feed hoppers, the TMR also meters product into feed bunks, but are not as mobile or versatile.

A TMR requires a large capital investment: about $25,000 to over $100,000. Only large animal operations can afford this type of mixer. On the other hand, the smaller feed hopper has a capital investment of less than $4,000, but it only transports the feed and has no cost savings.

The present invention overcomes the disadvantages of the prior art and provides a vehicle mounted feed hopper device that performs the same tasks as a larger feed hopper and mixes the feed as well. This invention provides small to medium sized livestock operations the same cost saving opportunity that the large operations have with the TMRs. The present invention accomplishes these goals of cost savings and accurate feed dispensing with mixers moving material opposite the conveyor.

SUMMARY OF THE INVENTION

Generally, the vehicle mounted feed hopper device has an enclosure upon a frame, the enclosure, or hopper, having a generally V shape, at least one paddle mixer journaled into the enclosure, a conveyor beneath the paddle mixer, an outlet proximate one end of the conveyor, an elongated flexible member operatively connected to the paddle mixer and the conveyor, and a hydraulic motor supplying driving force to the elongated flexible member through gearing. The present invention functions like the horizontal screw TMR, but at the scale of a small mobile feed hopper. The invention will accept multiple grain products through its open top and mix them like the TMR, except for roughage or silage products. Due to the capacity of this machine, it is impractical to include the roughage products into the mixer. The present invention dispenses its mixed feed through the outlet as it meters feed into feed bunks.

There has thus been outlined, rather broadly, the more important features of the invention in order that the detailed description thereof that follows may be better understood and that the present contribution to the art may be better appreciated. The present invention also includes paddles with multiple orientations, various fluting characteristics upon the conveyor, two mixers that turn in opposite directions, and reduction in eddy losses within the enclosure. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a vehicle mounted feed hopper device that mixes feed in a hopper mounted transverse upon a small truck.

Another object is to provide such a vehicle mounted feed hopper device that mixes multiple feeds excluding roughage, that is, plant fibers with long stems.

Another object is to provide such a vehicle mounted feed hopper that turns its conveyor and paddles in opposite directions.

Another object is to provide such a vehicle mounted feed hopper that can be readily installed and operated by hands, foremen, drivers, operators, and similar semi-skilled labor.

Another object is to provide such a vehicle mounted feed hopper that can be readily cleaned and repaired by hands, foremen, drivers, operators, and similar semi-skilled labor.

Another object is to provide such a vehicle mounted feed hopper that can be readily overhauled by implement mechanics.

Another object is to provide such a vehicle mounted feed hopper that can be easily and efficiently manufactured and marketed to the consuming ranchers, farmers, and livestock operations.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
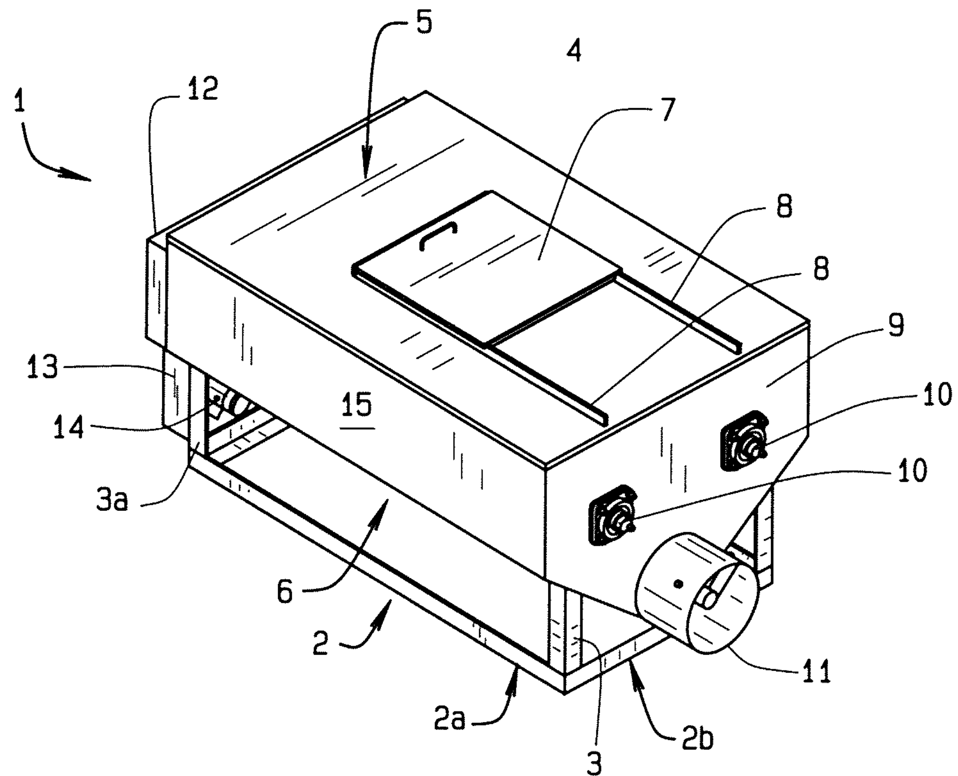
FIG. 1 provides a perspective view of the invention.

The present art overcomes the prior art limitations by providing a vehicle mounted feed hopper device. A prior art TMR holds between 140 to 1600 cubic foot of material and the present invention 1 will hold 10 to 100 cubic foot of material as shown in FIG. 1, within the class of mobile feed hoppers in the 10 to 100 cubic foot range. The present invention has a generally rectangular base 2 formed of angle iron defining a plane with two longitudinal side members 2*a* and two lateral end members 2*b*. The longitudinal side members are mutually parallel and spaced apart and the lateral end members are mutually parallel and spaced apart and perpendicular to the side members. At the intersection of an end member with a side member, the base has a leg 3 extending perpendicular to the end member, the side member, and the plane of the base. The base has an orientation to fit the invention transverse upon a transport vehicle, such as a light duty flat bed truck, thus the lateral end parallels the length of the truck.

Upon the base, the invention present invention has a metal enclosure 4 with a top panel 5 and a V shaped bottom 6 spaced apart and beneath the top panel. The top panel has a generally rectangular, planar shape, exceeding the dimensions of the base. Within the top panel, an aperture (not shown) receives material placed within the invention from an external source. The aperture has a lid 7 upon it as shown in FIG. 1. The lid is also generally rectangular with a size exceeding the aperture but much less than the dimensions of the top panel. The lid includes a handle upon it for manual opening. Opening of the lid occurs upon sliding it along a track, here shown as two mutually parallel and spaced apart rails 8 that extend outwardly from the aperture partially along the length of the top panel. Similar to the base, the top panel has two longitudinal edges and two lateral edges. The longitudinal edges are mutually parallel and spaced apart and the lateral edges are mutually parallel and spaced apart and perpendicular to the longitudinal edges. Upon one lateral edge proximate the rails 8, as at 5*a*, a back panel 9 depends perpendicular to and beneath the top panel 5. The back panel is generally planar but of a pentagonal shape that comports with the V shaped bottom 6. Extending from the back panel, the present invention has two spaced apart bearings 10 and an outlet 11 proximate the vertex the V shaped bottom 6. The outlet is generally round and hollow. The Applicant also foresees the lid 7 having a width nearly that of the hopper itself, while still sliding upon rails. In an alternate embodiment, the hopper has the lid removed so that it remains open entirely during its usage. The hopper without a lid may have a hollow frame resting upon the hopper that stiffens the side panels, back panel, and front panel as it provides a warning to persons approaching the hopper.

Opposite the back panel 9 and depending from the top panel 5 upon the other lateral edge 5*b*, a drive cover 12 extends beneath the top panel 5 and outwardly from the remainder of the enclosure. The drive cover extends generally opposite the chute as shown. The drive cover extends across the width of the top panel and descends to follow the V shaped bottom 6. Appurtenant to the drive cover, a motor cover 13 extends beneath the drive cover and along a portion of one half of the V shaped bottom. The motor cover conceals and shelters a hydraulic motor 14 secured to one leg, as at 3*a*.

Spanning between the back panel 9, the drive cover 12, and the top panel 5, the enclosure 4 has a side panel shown, here the left side panel 15. The left side panel depends from one longitudinal edge 5*c* of the top panel for the length of the top panel and generally more than the length of the longitudinal side members 2*a*. The left side panel depends for a height that accommodates the desired volume, or capacity of the invention, generally the height exceeds that of the legs 3. The height of the left side panel accommodates the internal mechanism for material handling, here shown as its bearings 10 in the back panel 9.

Figure 2:
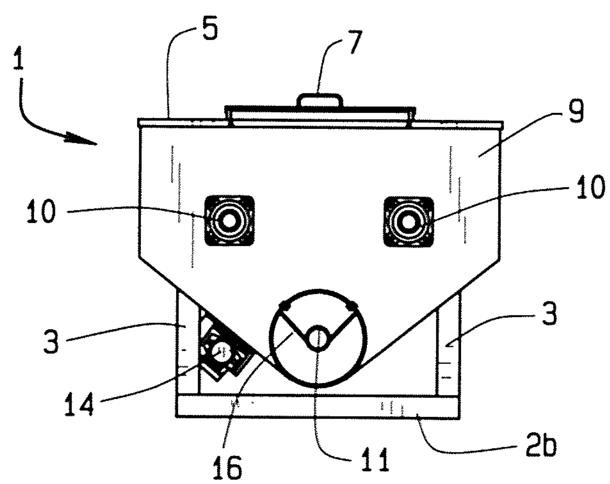
FIG. 2 shows an end view of the invention.

Turning the invention towards the back panel 9, FIG. 2 shows an end view typically seen during unloading of material. The enclosure 4 of the invention 1 has its lid 7 centered upon the top panel 5. From a lateral edge 5*a*, the back panel 9 depends perpendicular and beneath the top panel. The back panel has a pentagonal shape with one edge parallel to the lateral edge 5*a*, two mutually parallel and spaced apart side edges that join to the left side panel 15 and its counterpart right side panel as later shown in FIG. 6, and two other edges that attain a partially flattened V shape, as shown in this figure. The edges of the V shape have a rounded junction, centered upon the back panel and at the lowest portion of the back panel. Upon the back panel between the side edges, the bearings 10 of the internal mechanism extend. The bearings have a position generally in line with the rails 8 of the top panel 5. Proximate the junction of the edges of the V shape, the back panel has its outlet 11 that discharges the material from the hopper of the invention. The chute has its hollow round shape as before. Within the chute though, it has an outlet bearing 16 that supports a journal end of an internal mechanism later shown. The outlet bearing has a generally V shaped form with two attachments to the outlet generally towards the bearings 10. Inward from the back panel, the bottom 6 joined to the two edges of the V shape of the back panel accepts the legs 3 of the base 2, here shown as two legs. In the background, one leg, as at 3*a* in FIG. 1, receives the hydraulic motor 14 proximate the motor cover, that is opposite from the back panel. The legs 3 connect to the base at the lateral member 2*b* and have a height so that the outlet is slightly above the lateral member.

Figure 3:
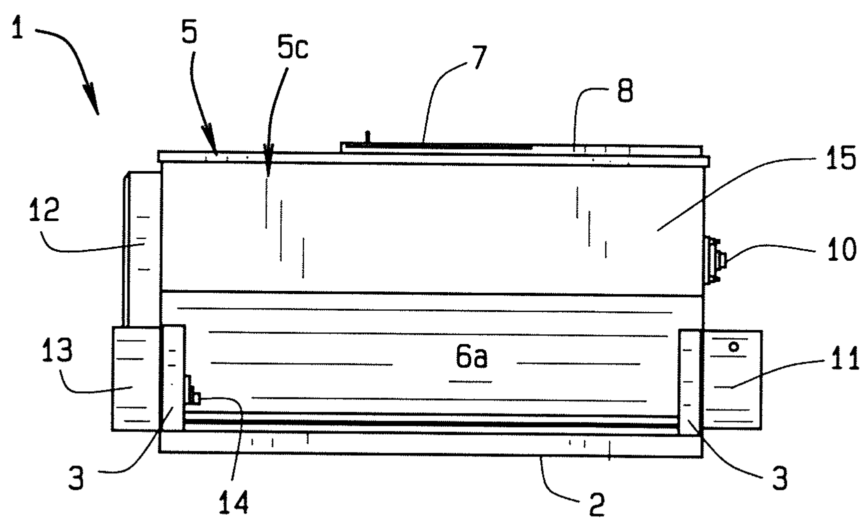
FIG. 3 shows a side view of the invention.

Rotating the invention once more, FIG. 3 shows a side view of the invention 1 generally along its length. The invention has its enclosure 4 connecting to the base 2 upon legs 3 as previously described. The enclosure 4 has its top panel 5, here shown on its longitudinal edge 5*c*, with the back panel 9 towards the right of the figure and mutually spaced apart from the drive cover 12 towards the left of the figure. The back panel has the bearings 10 of the internal mechanism extending outwardly from it and the outlet 11 also extending outwardly from the back panel and slightly above the lateral member 2*b* of the base 2. The drive cover 12 extends outwardly from the enclosure, that is, beyond the length of the top panel and extends downwardly, that is, towards the plane of the base 2. Beneath the drive cover, the enclosure has the motor cover 13 of shorter height and width than the drive cover, as later shown in FIG. 4. The motor cover shelters and conceals the motor 14 as previously described. Between the motor cover, the legs, and the back panel, the enclosure has the left side panel 15 and a portion of the V shaped bottom, here at 6*a*. The left side panel has a generally elongated rectangular shape of similar length to the top panel, particularly the longitudinal edge 5*c*. The portion of the V shaped bottom also has a generally elongated rectangular shape of similar length as the left side panel but at an inwardly sloping angle from the left side panel. The inwardly sloping angle defines on half of the V shaped bottom.

Figure 4:
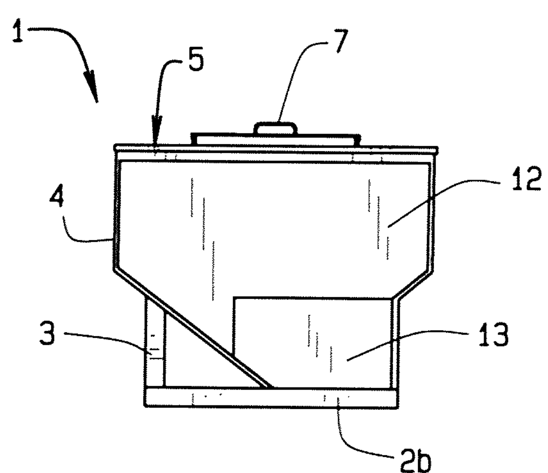
FIG. 4 provides an end view of the invention opposite that of FIG. 2.

Having mentioned the drive cover previously, FIG. 4 shows an end view of the invention with the drive cover 12 in the foreground. The drive cover also has a pentagonal shape similar to that of the back panel. However, the drive cover has its pentagonal shape truncated proximate the intersection of the edges of the V shape by the motor cover 13. The motor cover has a generally rectangular shape fitted upon the intersection of the edges of the V shape defining the bottom of the drive cover and with one corner of the motor cover itself truncated to follow the V shape of the bottom as shown. The motor cover rests upon a lateral member 2*b* of the base and in front of leg 3*a*, not shown, that supports the motor. Above the drive cover, the enclosure has the top panel 5 with its lid 7 as previously described.

Figure 5:
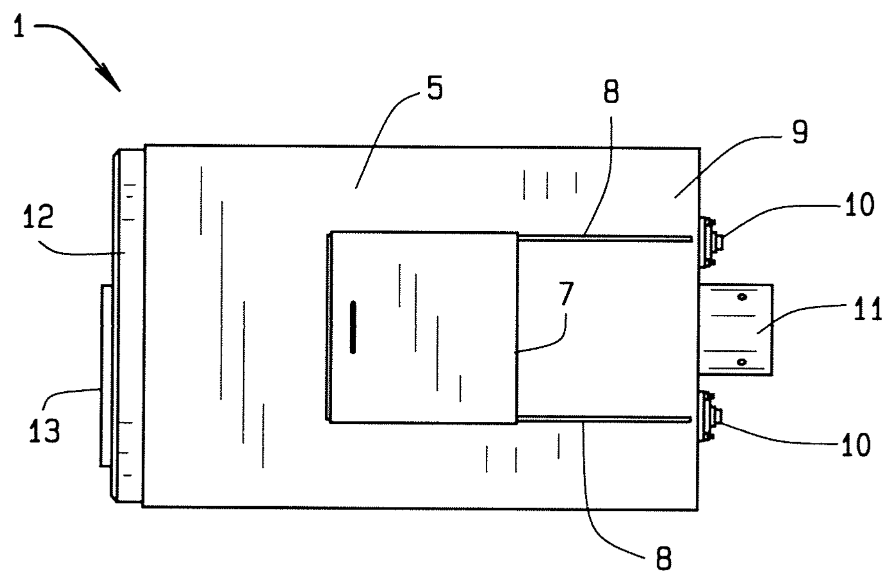
FIG. 5 describes a top view of the invention.

After viewing the invention from two ends and a side, FIG. 5 shows the invention from above. The invention 1 has its enclosure 4 with the top panel 5 that has a lid 7 upon rails 8 towards one end. Proximate that end, the invention has the back panel 9, here to the right, with the two spaced apart bearings 10 centered about and above the outlet 11. Opposite the back panel, the enclosure has the drive cover 12 connecting to the top panel and the motor cover 13 slightly beneath the drive cover.

Figure 6:
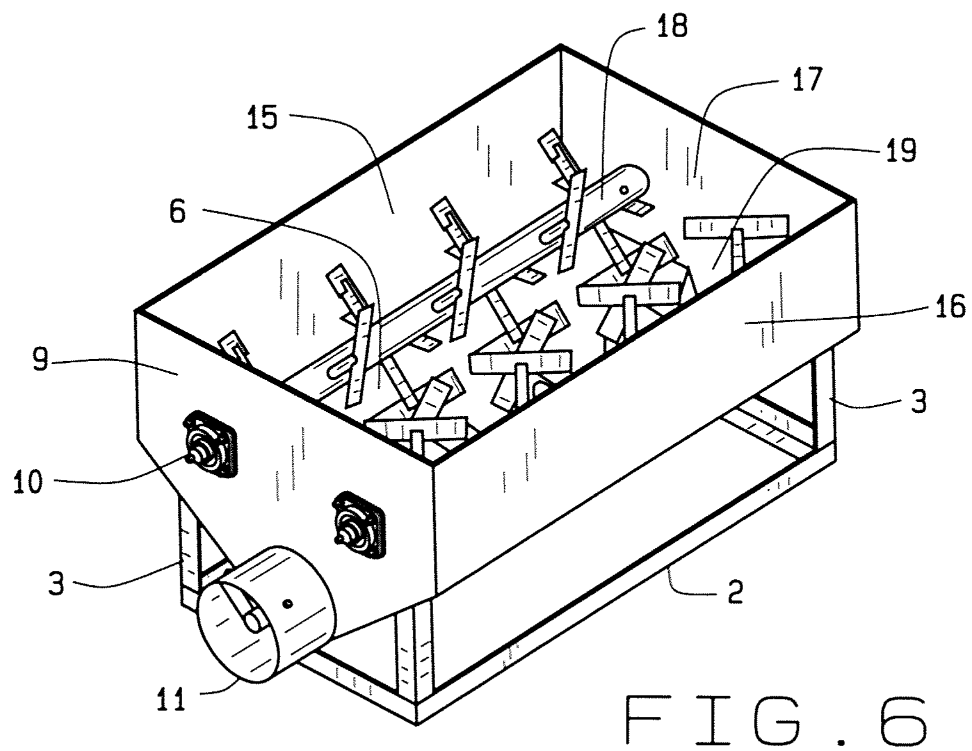
FIG. 6 illustrates a perspective view of the invention with the top removed and chute in the foreground.

Upon removing the top panel 5, the drive cover 12, and the motor cover 13, FIG. 6 shows the invention with its enclosure 4 and internal mechanism within the enclosure and the back panel 9 in the foreground. The enclosure rests upon the legs 3 of the base 2 as described above. The enclosure also has its back panel 9, left side panel 15, and bottom portion 6*a* as previously described. The enclosure also has its right side panel 16 of similar dimensions to the left side panel and mutually parallel and spaced apart from the left side panel. Spanning between the left side panel and the right side panel opposite the back panel 9, the enclosure has its front panel 17. The front panel has a similar pentagonal shape as the back panel. From the bearings 10 inwardly, the invention has a left mixer 18 having a plurality of paddles thereon, generally to the left of the chute 11 and extending to the front panel 17, and a right mixer 19 having a plurality of paddles at a different orientation that the paddles of the left mixer, generally to the right of the chute 11 and extending to the front panel 17. The left mixer and the right mixer are generally shafts with T shaped paddles extending perpendicular to the shafts. The left mixer and the right mixer counter rotate to assist in moving material or feed through the hopper.

Figure 7:
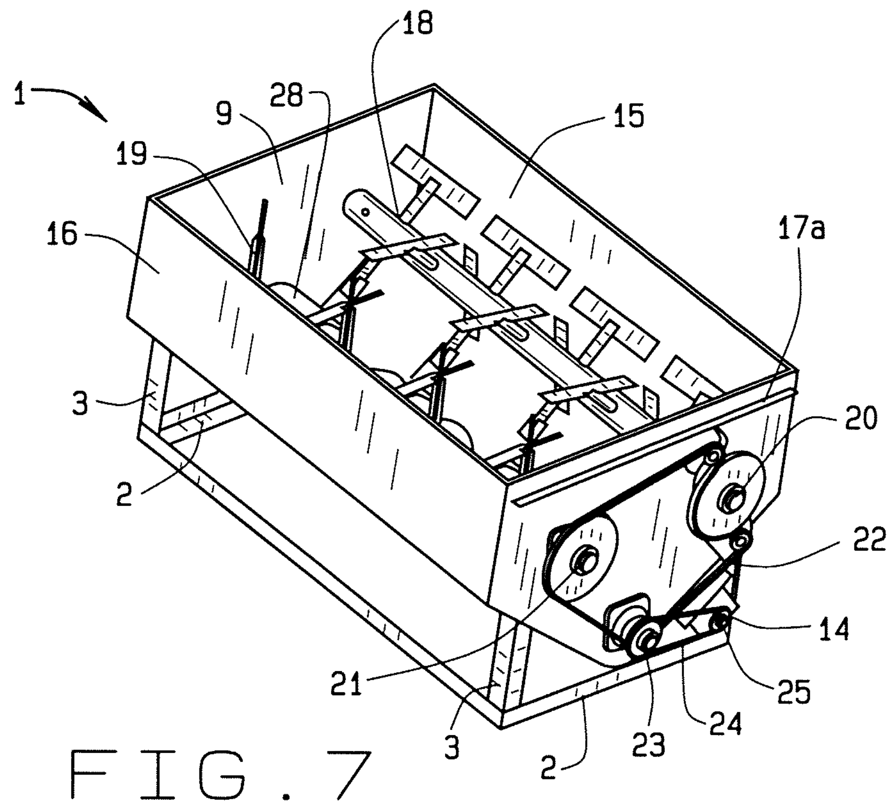
FIG. 7 provides a perspective view of the invention with the top removed and gearing in the foreground.

Similar to FIG. 6, FIG. 7 here shows the invention with its enclosure 4 and internal mechanism inside it but the front panel 17 in the foreground. The enclosure rests upon the legs 3 of the base 2 as described above. The enclosure also has its back panel 9, left side panel 15, and bottom portion 6*a* as previously described. The enclosure also has its right side panel 16 of similar dimensions to the left side panel and mutually parallel and spaced apart from the left side panel. Spanning between the left side panel and the right side panel opposite the back panel 9, the enclosure has its front panel 17. The front panel has a similar pentagonal shape as the back panel. From the bearings inwardly as previously shown, the invention has the left mixer 18 with fewer paddles shown in this figure and extending to the front panel 17, and the right mixer 19 having a plurality of paddles, generally to the right of the chute 11 and extending to the front panel 17. The shafts of the left mixer and the right mixer each connect to a sprocket, as at 20, 21 respectively outwardly of the front panel. The sprockets rotate by action of a chain 22, or other flexible elongated member, such as a belt, so that the sprockets rotate in opposite directions. The chain also turns a gear 23 connected to a screw conveyor, not shown. The screw gear also operatively receives a drive chain 24, or other flexible elongated member, and the drive chain operatively connects to the drive sprocket 25 of the motor 14. The hydraulic motor provides at least four horsepower suitable for simultaneously driving two mixers and the screw conveyor with material thereon. The hydraulic motor operates from the host vehicle hydraulic system. Alternatively, the motor operates upon reduction gearing and shafts from the drive train of the host vehicle. From testing, the applicant has identified that electrical motors in this application would draw current in excess of the capacity of the typical host vehicle, or truck. Alternatively, a gearbox drive, not shown, supplies direct mechanical power transfer from the host vehicle drive train to the conveyor and the paddles. The direct power transfer occurs through a gear box and related shaft or alternatively through load cells. Upwardly from the two sprockets, the front panel also has a shelf 17*a* that extends across the width of the panel and slightly outwardly from the panel, such as for the width of the chain.

Figure 8:
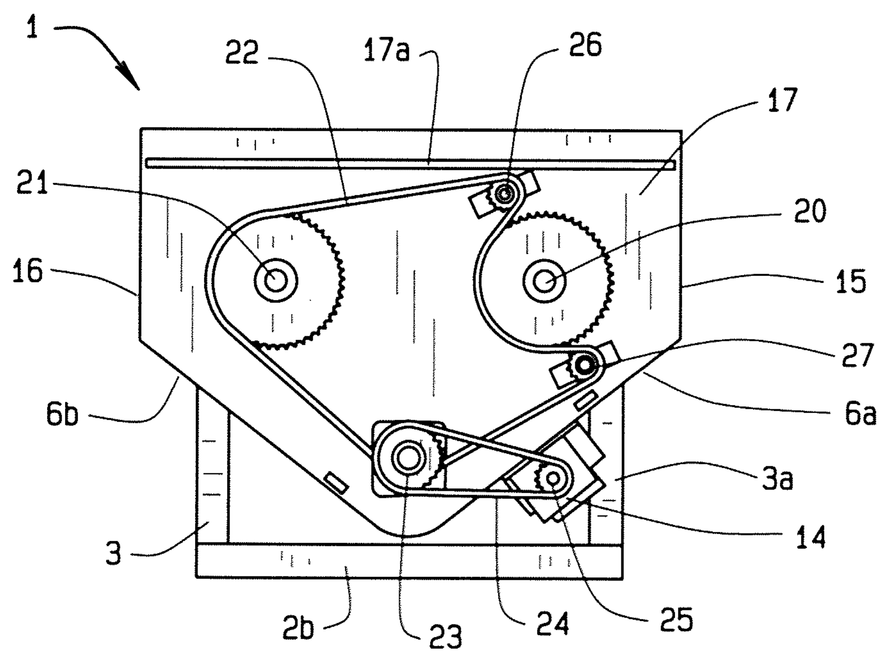
FIG. 8 describes an end view of the invention including gearing.

FIG. 8 shows the driving mechanism of the invention more closely. As above, the left mixer connects to its sprocket 20 and the right mixer to its sprocket 21 outwardly of the front panel. The two sprockets have the largest diameter and largest tooth count of the components in the driving mechanism. The sprockets rotate by the action of the chain 22, belt, or other flexible elongated member, in opposite directions. The opposite rotation occurs as the chain 22 passes upon a first idler pulley 26 upon the front panel slightly beneath the shelf 17*a*, above the left sprocket 20 and inwardly from the center of the left sprocket. Also keeping tension in the chain or other flexible elongated member, a second idler pulley 27 has its position upon the front panel beneath the left sprocket 20, outwardly from the center of the left sprocket, and outwardly from the first sprocket. The two idler pulleys have sufficient biasing strength, maintaining the chain 22 taut during initial mixing of material, the time of maximum load, and later during continuous mixing, a time of lesser load upon the driving mechanism. The chain continues around the second idler pulley and turns the gear 23 connected to a screw conveyor. Outwardly from the screw gear, the screw shaft also has a drive gear 23*a* with a larger diameter than the screw gear and a higher tooth count. This drive gear 23*a* receives the drive chain 24 that delivers the power from the motor's drive sprocket 25. The hydraulic motor secures to the leg 3*a* and the left bottom 6*a* as shown. The enclosure rests upon the other legs 3 and the base 2.

Figure 8A:
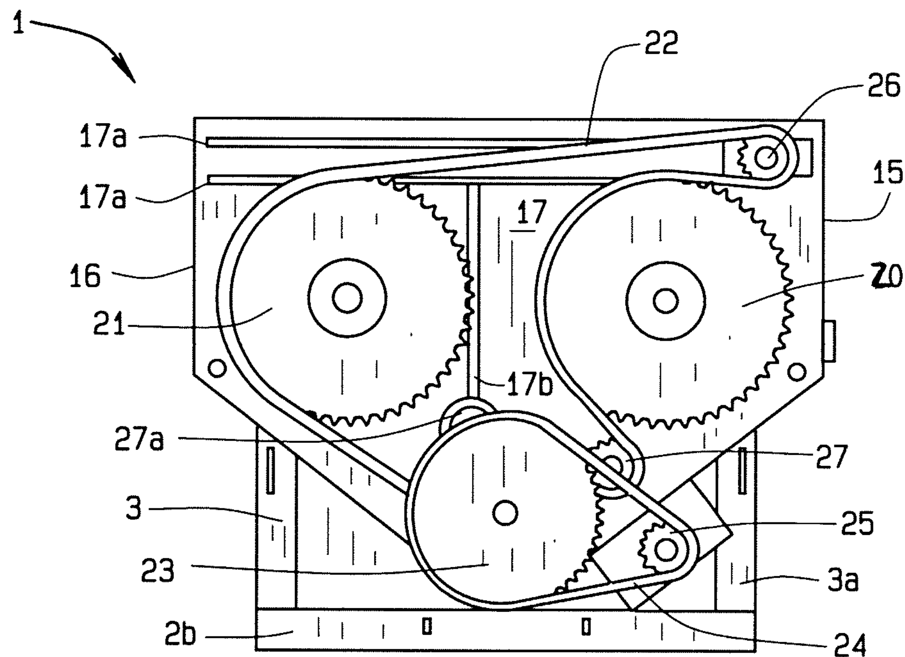
FIG. 8*a* shows an end view of an alternate embodiment of the invention including gearing.

FIG. 8*a* provides an alternate embodiment of the driving mechanism where the left mixer connects to its sprocket 20 and the right mixer to its sprocket 21 outwardly of the front panel 17. The two sprockets have the largest diameter as shown. The sprockets rotate by the action of the chain 22 or other flexible elongated member, in opposite directions. The opposite rotation occurs as the chain 22 passes upon a first idler pulley 26 located upon the front panel between two shelves 17*a* towards the left side panel 15, above the left sprocket 20 and outwardly from the center of the left sprocket. Also keeping tension in the chain or other flexible elongated member, a second idler pulley 27 has its position upon the front panel beneath the left sprocket 20, inwardly from the center of the left sprocket and the first sprocket. The chain continues to a third idler pulley 27*a* partially shown in this figure behind drive gear 23 of the conveyor. The three idler pulleys have sufficient biasing strength, maintaining the chain 22 taut during initial mixing of material, the time of maximum load, and later during continuous mixing, a time of lesser load upon the driving mechanism. The chain continues around the third idler pulley and turns a gear sprocket 23*a* connected to the screw conveyor but concealed behind the drive gear 23. The chain then travels from the gear sprocket to the sprocket 21 for the right mixer. Outwardly from the gear sprocket 23*a*, the screw shaft also has the drive gear 23 with a larger diameter than the gear sprocket and a higher tooth count. This drive gear 23 receives the drive chain 24 that delivers the power from the motor's drive sprocket 25 as shown before.

Figure 8B:
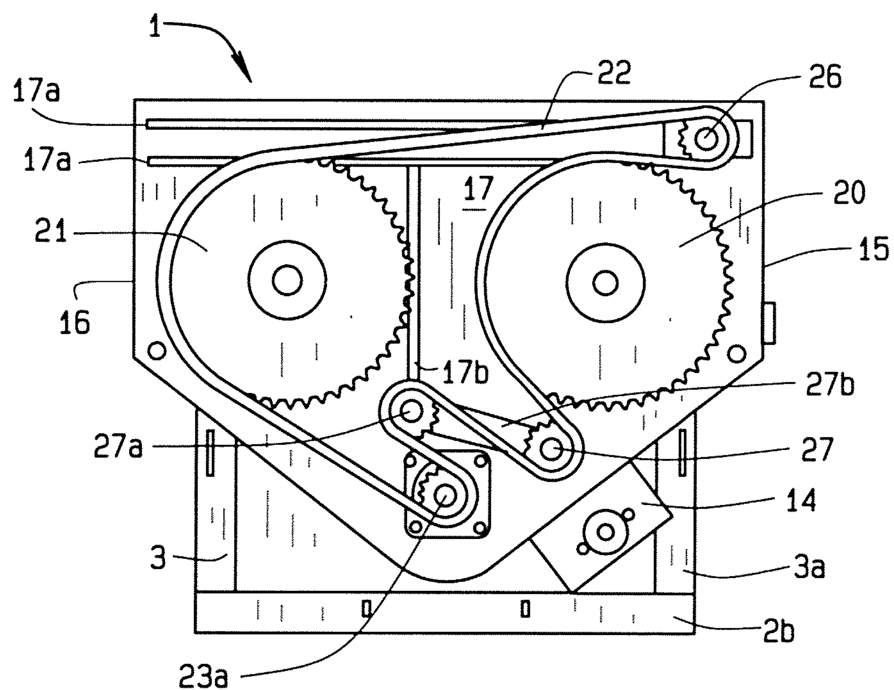
FIG. 8*b* shows an end view of the alternate embodiment with the drive gear removed.

FIG. 8*b* shows the gearing and chain proximate the front panel 17 with the drive gear 23 and drive chain 24 removed. As above, the chain 22 begins its travels upon the first idler pulley 26 and proceeds above the left sprocket 20 and inwardly from the center of the left sprocket. The chain proceeds around the inner teeth of the left sprocket towards the second idler pulley 27 which is beneath the left sprocket and inwardly from the center of the left sprocket and the first sprocket. The chain continues to a third idler pulley 27*a* spaced inwardly from the second idler pulley upon an idler arm 27*b*. The third idler pulley is located upon the pivoting end of the idler arm 27*b* while the second idler pulley is upon the free end of the idler arm as shown. The idler arm's pivoting end and the second idler puller are generally proximate the gear sprocket 23*a*. The pivoting end of the idler arm secures to a post 17*b* upon the front panel. The post is generally perpendicular to the shelves 17*a* and upon the exterior of the front panel as shown. The chain continues around the third idler pulley and turns the gear sprocket 23*a* so that the screw conveyor turns. The chain then travels from the gear sprocket to the sprocket 21 for the right mixer and back to the first idler pulley. The three idler pulleys in cooperation with the idler arm provide sufficient biasing to keep the chain 22 taut during initial mixing of material, maximum load of material, and during lesser load upon the driving mechanism.

Figure 9:
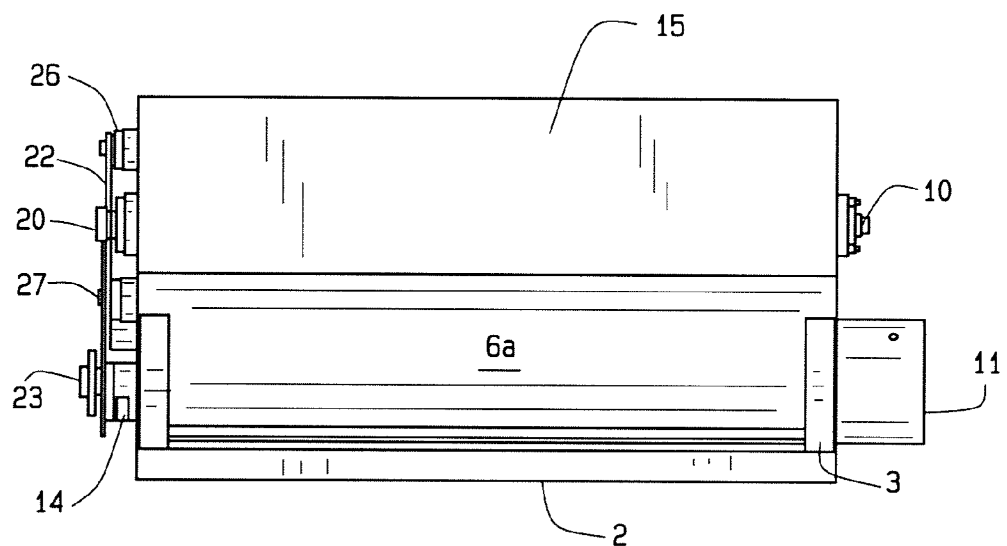
FIG. 9 shows a side view of the invention with covers removed from FIG. 3; and, FIG. 10 describes a top view of the invention with the lid and top panel removed from FIG. 5.

Turning the invention again, FIG. 9 shows the invention from a side view with the top panel, drive cover, and motor cover removed. This figure has a similar appearance to FIG. 3 but here showing the drive mechanism from the side.

Figure 10:
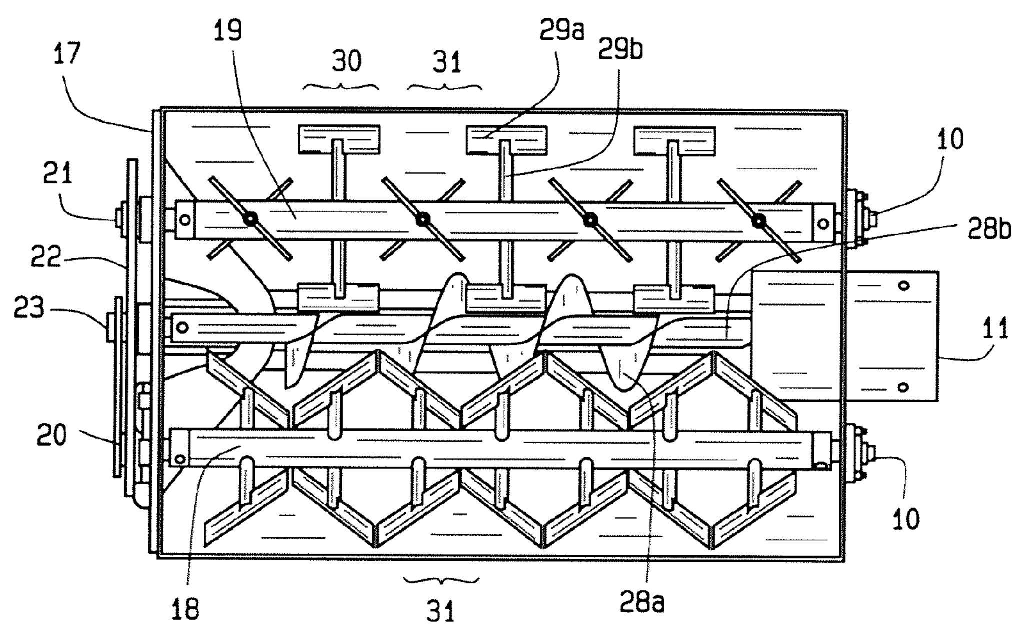

As mentioned above, the driving mechanism turns three components simultaneously to mix product in a hopper, enclosure of this volume. FIG. 10 shows the three components and the remainder of the invention from above. The driving mechanism supplies power from the motor 14 through the screw gear 23 to a screw conveyor 28, then the right sprocket 21 to the right mixer 19, and then the left sprocket 20 to the left mixer 18. The screw conveyor 28 has its position within the bottom 6 of the enclosure 4, generally centered, and a distance above the junction of the two edges of the V shape described above. The screw conveyor includes helical flights at a regular interval and arranged to advance material axially, along the screw conveyor. The flighting, as at 28*a*, has a construction of a coiled bar of metal wrapped around a shaft 28*b*. During usage, an operator directs the screw conveyor in clockwise rotation to mix the material and move it away from the dispensing outlet, that is, towards the front panel. Then for dispensing of material, the operator reverses the direction of the screw conveyor, that is, counter-clockwise, which moves the material toward the outlet 11, dispensing it into a feed bunk. The helical flights have an outer diameter that fits within the bottom panels as at 6.

For this volume of hopper, the invention has at least one paddle mixer above the screw conveyor. Though FIG. 10 shows two paddle mixers, the Applicant foresees that the invention may operate upon a single paddle mixer in an alternate embodiment. Meanwhile, the two paddle mixers, 18, 19 always move the feed in the opposite direction from the screw conveyor, producing two dimensions of mixing. The paddle mixers mix the material where one, 18, turns clockwise while the other, 19 turns counterclockwise, the paddle mixers counter rotate. Each paddle mixer has a plurality of paddles arranged thereon. Each paddle, as at 29 has a generally T shape with a wide, rectangular plate 29*a* parallel to a plane including the length of the mixer shaft, and a thin rounded stem 29*b* generally perpendicular to the mixer shaft. Each paddle mixer may have paddles 29 in select arrangements. Here, the right mixer 19 has paddles in a primary arrangement 30 and a secondary arrangement 31. The primary arrangement has paired paddles in opposition with the plates 29*a* generally at an angle to the shaft, particularly towards its length or longitudinal axis. The angle of the paddles, particularly the plates, is from about 15° to about 75°. The secondary arrangement has paired paddles in opposition but with the plates pitched at the mirror image to the plates of the primary arrangement, that is, from about 75° to about 15° to the shaft, particularly towards its length or longitudinal axis and opposite that of the plate on the other side, forming an X shaped pattern as shown. Here, the right mixer has three primary arrangements between four secondary arrangements of its paddles in an alternating manner which produces an axial movement of the feed, often grain. Opposite the right mixer, the left mixer 18 has seven secondary arrangements of its paddles. In another embodiment, the invention has produced optimal flow of feed utilizing paddles at a 45° angle to the shaft.

Therefore, while in mixing mode of the invention, the left mixer and the right mixer, through their paddles, drive the material or feed, longitudinally, toward the dispensing outlet, that is, the back panel 9 of the hopper and the screw conveyor drives it away from the dispensing outlet towards the front panel 17. When the feed reaches the front panel 17, the conveyor discharges the feed against the bottom 6 and its portions 6*a*, 6*b* with their approximately 45° upward angle, shown in FIGS. 2, 3, 8. The paddle mixers counter rotate and in mixing mode raise feed in the center of the hopper and lower feed on the outside of the hopper. The feed then travels upwardly on the bottom portions until the paddle mixers, 18, 19 collect the feed and move it towards the back panel. Upon engaging the back panel, the feed drops into a void created by the screw conveyor and the mixing cycle repeats.

While in the mode of dispensing feed from the invention, the left mixer and the right mixer, through their paddles, continue mixing, but they drive the material away from the back panel towards the front panel. The screw conveyor, though below the paddles, therefore conveys the feed in the opposite direction, that is, toward the back panel, and out the dispensing outlet. The paddle mixers and the screw conveyor rotate in the opposite direction as in the mixing mode.

In an alternate embodiment, the present invention includes switches and wiring from the device to a remote location, such as the cab of a host vehicle or truck. The switches are foreseen to control rotation and direction of the mixers and the conveyor either jointly or singly.

The screw conveyor and the left mixer and the right mixer turn using a hydraulic motor 14 coupled by a chain dive 24, 22. The prior art hoppers typically utilize DC electric gear motors. The present invention uses hydraulic actuated motors to meet the greater horsepower requirements of the mixing action. Few hoppers in the prior art use a paddle style mixing screw as in the present invention. And fewer prior art hoppers, if any, drive their conveyors and paddles in one direction to mix and the opposite direction to dispense as in the present invention.

From the aforementioned description, a vehicle mounted feed hopper device has been described. The vehicle mounted feed hopper device is uniquely capable of mixing feed materials, excluding silage, in a hopper less than 101 cubic feet while attaining blends suitable and nutritious for livestock. The vehicle mounted feed hopper device and its various components may be manufactured from many materials, including but not limited to, wood, steel, aluminum, polymers, polypropylene, polyvinyl chloride, high density polyethylene, polypropylene, ferrous and non-ferrous metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for mixing and dispensing animal feed and material excluding silage, said device having a length and a height, comprising:

a left mixer having a plurality of paddles in a first arrangement;

a right mixer having a plurality of paddles in a second arrangement;

said left mixer and said right mixer counter rotating;

said left mixer having a cylindrical shaft, a plurality of paddles upon said shaft, said shaft having two opposite ends and a sprocket upon one end of said shaft, and each of said paddles at an angle to said shaft from about 15° to about 75° wherein said first arrangement and said second arrangement allow the paddles to pass freely;

said right mixer having a cylindrical shaft, a plurality of paddles upon said shaft, said shaft having two opposite ends and a sprocket upon one end of said shaft, and each of said paddles at an angle to said shaft from about 15° to about 75° wherein said first arrangement and said second arrangement allow the paddles to pass freely;

a screw conveyor having a cylindrical shaft, helical flights upon said shaft, said shaft having two opposite ends, and a sprocket upon one end of said shaft, the shafts of said left mixer and said right mixer being generally parallel and spaced above the shaft of said screw conveyor;

a flexible elongated member engaging said sprocket of said at least one mixer and said sprocket of said screw conveyor;

a motor driving said flexible elongated member wherein said at least one mixer and said screw conveyor mix the animal feed in opposite directions;

an outlet outwardly from the other end of said shaft of said conveyor and opposite said sprocket, wherein said screw conveyor dispenses feed of a desired blend through said outlet for consumption by animals;

a hopper, generally elongated and prismatic, having a left side panel, a mutually parallel and spaced apart right side panel, a front panel perpendicular to said left side panel and a mutually parallel and spaced apart back panel, a bottom depending from said left side panel and said right side panel;

said outlet locating upon said back panel;

said sprocket of said left mixer, said sprocket of said right mixer, and said sprocket of said screw conveyor locating upon said front panel;

said front panel having a width, two mutually parallel and spaced apart shelves thereon extending from said front panel, said shelves extending parallel to the width of said front panel and above said left sprocket and said right sprocket, and a post upon said front panel extending perpendicular and downwardly from the lower of the two said shelves;

a first idler pulley, a second idler pulley, a third idler pulley, and an idler arm, each locating proximate said front panel;

said first idler pulley locating between said shelves, above said left sprocket, outwardly from a center of said left sprocket, and proximate said left side panel;

an idler arm having a free end and an opposite pivoting end, said post terminating proximate said pivoting end, said second idler pulley locating upon said free end, and said third idler pulley locating upon said pivoting end, said second idler pulley operatively locating beneath said left sprocket, and said third idler pulley operatively locating above said screw conveyor's sprocket;

said flexible elongated member being a continuous chain, said chain travelling from beneath said first idler pulley in a direction of said post partially around said left sprocket to said second idler pulley in a direction away from said post then around said second idler pulley to said third idler pulley at said post then around said second third pulley in a direction of beneath said post to said screw conveyor's sprocket then around said screw conveyor's sprocket in a direction of said right sprocket partially around said right sprocket then across said shelves to said first idler pulley, said idler arm maintaining said chain taught;

said motor operatively connecting to said chain making said left mixer and said right mixer counter rotate and said screw conveyor rotate simultaneously.

2. The mixing and dispensing animal feed device of claim 1 wherein said left mixer and said right mixer cooperatively move feed along the length of said device and said screw conveyor moves the feed oppositely.

3. The mixing and dispensing animal feed device of claim 1 wherein upon rotating said left mixer in a first direction and said right mixer in an opposite direction, said left mixer and said right mixer move the feed towards said outlet and rotating said screw conveyor in a first direction moves the feed away from said outlet for mixing of the feed; and, wherein upon rotating said left mixer in a second direction and said right mixer in an opposite direction, said left mixer and said right mixer move the feed away from said outlet and rotating said screw conveyor in a second direction moves the feed towards said outlet for dispensing of feed from the device, said bottom having a generally V like shape.

4. The mixing and dispensing animal feed device of claim 1 wherein each of said paddles has an angle to said shaft of 45°.

5. A device for mixing and dispensing animal feed, said device having a length, and a height, comprising:

two mixers, including a left mixer and a right mixer, each of said mixers having a cylindrical shaft, a plurality of paddles upon said shaft and each of said paddles at an angle to said shaft from about 15° to about 75°, said shaft having two opposite ends, and a sprocket upon one end of said shaft, said mixers being counter rotating;

a screw conveyor having a cylindrical shaft, helical flights upon said shaft, said shaft having two opposite ends, and a sprocket upon one end of said shaft;

a hopper, generally elongated and prismatic, having a left side panel, a mutually parallel and spaced apart right side panel, a front panel perpendicular to said left side panel and a mutually parallel and spaced apart back panel, a bottom depending from said left side panel and said right side panel, said bottom having a generally V like shape;

said front panel having a width, two mutually parallel and spaced apart shelves thereon extending from said front panel, said shelves extending parallel to the width of said front panel and above said left sprocket and said right sprocket, and a post upon said front panel extending perpendicular and downwardly from the lower of the two said shelves;

one of said mixers having a plurality of paddles in a first arrangement and the other of said mixers having a plurality of paddles in a second arrangement wherein said first arrangement and said second arrangement allow the paddles to pass freely;

said screw conveyor positioning proximate said bottom and said left mixer and said right mixer position away from said bottom;

the shafts of said mixers being mutually parallel and spaced apart and parallel to said left side panel and said right side panel, and spaced above the shaft of said screw conveyor;

a flexible elongated member engaging said sprockets of said mixers and said sprocket of said screw conveyor;

a motor driving said flexible elongated member;

an outlet outwardly from the other end of said shaft of said conveyor and opposite said sprocket;

a first idler pulley, a second idler pulley, a third idler pulley, and an idler arm, each locating proximate said front panel;

said first idler pulley locating between said shelves, above said left sprocket, outwardly from a center of said left sprocket, and proximate said left side panel;

an idler arm having a free end and an opposite pivoting end, said post terminating proximate said pivoting end, said second idler pulley locating upon said free end, and said third idler pulley locating upon said pivoting end, said second idler pulley operatively locating beneath said left sprocket, and said third idler pulley operatively locating above said screw conveyor's sprocket;

said flexible elongated member being a continuous chain;

said chain travelling from beneath said first idler pulley in a direction of said post partially around said left sprocket to said second idler pulley in a direction away from said post then around said second idler pulley to said third idler pulley at said post then around said second third pulley in a direction of beneath said post to said screw conveyor's sprocket then around said screw conveyor's sprocket in a direction of said right sprocket partially around said right sprocket then across said shelves to said first idler pulley;

said first idler pulley, said second idler pulley, said third idler pulley, and said idler arm cooperatively maintaining said chain taught;

said motor operatively connecting to said chain making said mixers counter rotate and said screw conveyor rotate;

wherein said mixers and said screw conveyor mix the animal feed along the length of said device and through the height of said device and said screw conveyor rotates opposite to one of said mixers; and, wherein said screw conveyor dispenses feed of a desired blend through said outlet for consumption by animals.

* * * * *